United States Patent
Nagai et al.

(10) Patent No.: US 7,014,725 B2
(45) Date of Patent: Mar. 21, 2006

(54) MULTILAYER CERAMIC ELECTRONIC COMPONENT MANUFACTURING METHOD INCLUDING A SINTERED ADHESIVE LAYER WITH A RESIN AND INORGANIC POWDER

(75) Inventors: Atsuo Nagai, Hirakata (JP); Jun Otsuki, Hirakata (JP); Hideki Kuramitsu, Hirakata (JP); Keiji Kobayashi, Kawachinagano (JP)

(73) Assignee: Matsushita Electric Industrial Co., Ltd., (JP)

( * ) Notice: Subject to any disclaimer, the term of this patent is extended or adjusted under 35 U.S.C. 154(b) by 177 days.

(21) Appl. No.: 10/470,099

(22) PCT Filed: Oct. 22, 2002

(86) PCT No.: PCT/JP02/10926

§ 371 (c)(1),
(2), (4) Date: Jul. 25, 2003

(87) PCT Pub. No.: WO03/036667

PCT Pub. Date: May 1, 2003

(65) Prior Publication Data
US 2004/0070903 A1     Apr. 15, 2004

(30) Foreign Application Priority Data

Oct. 25, 2001  (JP) ............................. 2001-327344
Oct. 25, 2001  (JP) ............................. 2001-327345

(51) Int. Cl.
*C03B 29/00*     (2006.01)

(52) U.S. Cl. ................ 156/89.11; 156/89.12; 156/89.16

(58) Field of Classification Search ............... 438/250, 438/253, 396; 156/89.11, 89.12, 89.16
See application file for complete search history.

(56) References Cited

U.S. PATENT DOCUMENTS

| 4,835,656 A | * | 5/1989 | Kitahara et al. | 361/321.3 |
| 5,126,915 A | * | 6/1992 | Pepin et al. | 361/304 |
| 6,207,230 B1 | * | 3/2001 | Ohya et al. | 427/227 |

FOREIGN PATENT DOCUMENTS

| JP | 63-260122 | 10/1988 |
| JP | 3-236210 | 10/1991 |
| JP | 05109584 A | * 4/1993 |

* cited by examiner

Primary Examiner—William M. Brewster
(74) Attorney, Agent, or Firm—Steptoe & Johnson LLP

(57) ABSTRACT

A first step of alternately stacking a ceramic sheet and an internal electrode with an adhesive layer between the ceramic sheet and the internal electrode to obtain a laminated body, and a second step of sintering the laminated body are provided. The adhesive layer includes a thermoplastic resin and at least one of Cr, Mg, Al, Si, a Cr compound, an Mg compound, an Al compound, an Si compound and an inorganic powder included in the ceramic sheet. This manufacturing method improves adhesion between a ceramic layer and the internal electrode after sintering and suppresses a structural defect such as delamination or a crack.

9 Claims, 4 Drawing Sheets

MULTILAYER CERAMIC ELECTRONIC COMPONENT MANUFACTURING METHOD INCLUDING A SINTERED ADHESIVE LAYER WITH A RESIN AND INORGANIC POWDER

TECHNICAL FIELD

The present invention relates to a method of manufacturing a multilayer ceramic electronic component such as a multilayer ceramic capacitor.

BACKGROUND ART

FIG. 7 is a sectional view for illustrating a conventional manufacturing process for a multilayer ceramic capacitor.

First, dielectric material such as barium titanate, an organic binder and an organic solvent are mixed, and this mixture is used to form ceramic sheet 1 on base film 2 made of, for example, polyethylene terephthalate (hereinafter referred to as PET). Thereafter, a solution of synthetic rubber dissolved in an organic solvent is sprayed over ceramic sheet 1, thus forming adhesive layer 4. On the other hand, metal film 3 in the form of an internal electrode is formed on substrate 5. This metal film 3 is then transferred by pressing substrate 5 formed with metal film 3 against ceramic sheet 1. Ceramic sheets 1 each including transferred metal film 3 are stacked on top of each other and then sintered, whereby a sintered body is obtained. Thereafter, the sintered body is provided with external electrodes at its respective end faces, thus forming the multilayer ceramic capacitor.

According to the method described above, adhesive layer 4 is formed of only the organic material, and this organic material scatters in sintering, whereby a space is formed, thus causing a structural defect such as delamination or a crack.

SUMMARY OF THE INVENTION

According to the present invention, a method of manufacturing a multilayer ceramic electronic component includes a first step of alternately stacking a ceramic sheet and an internal electrode with an adhesive layer between the ceramic sheet and the internal electrode to obtain a laminated body, and a second step of sintering the laminated body. The adhesive layer includes a thermoplastic resin and at least one of chromium (Cr), magnesium (Mg), aluminum (Al), silicon (Si), a Cr compound, an Mg compound, an Al compound, an Si compound and an inorganic power included in the ceramic sheet.

DETAILED DESCRIPTION OF THE PREFERRED EMBODIMENTS

Figure 1:
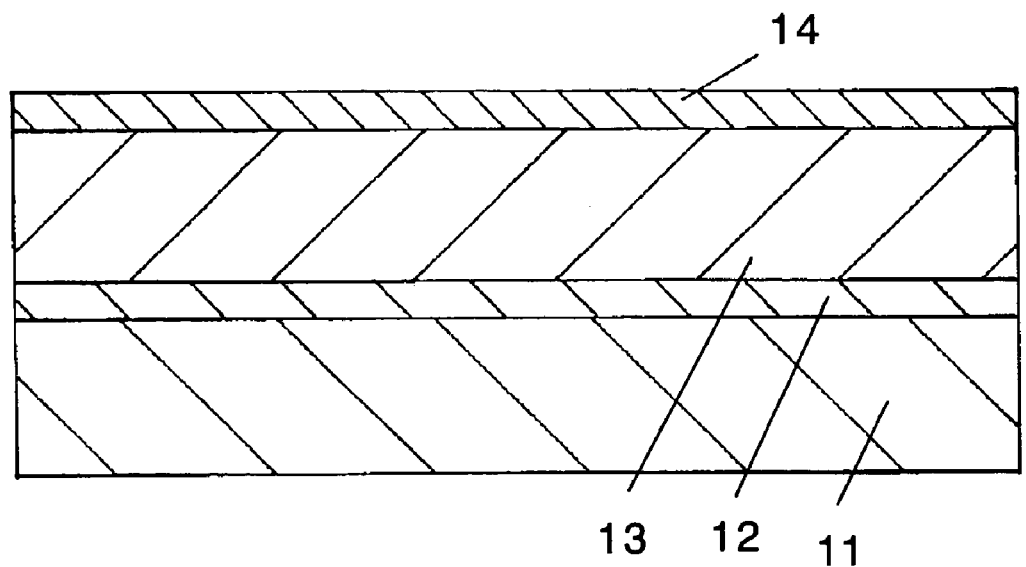
FIGS. 1–5 are sectional views for illustrating a manufacturing process for a multilayer ceramic capacitor in accordance with first through fourth exemplary embodiments of the present invention.

Exemplary embodiments will be demonstrated hereinafter with a multilayer ceramic capacitor taken as an example. It is to be noted that similar elements in the embodiments have the same reference numerals and will not be described repeatedly in detail.

(First Exemplary Embodiment)

A description will be provided hereinafter of a manufacturing method for a multilayer ceramic capacitor in accordance with the first exemplary embodiment.

First, slurry is made by mixing dielectric material (inorganic powder) such as barium titanate with polyvinyl butyral resin as a binder, dibutyl phthalate as a plasticizer and butyl acetate as a solvent. Next, this slurry is applied to separation layer 12 formed on first base film 11 by a doctor blade method to form ceramic sheet 13 with a thickness of 8 μm, as shown in FIG. 1. Separation layer 12 is provided to facilitate separation between first base film 11 and ceramic sheet 13 and is made of silicon resin.

Another slurry is made by mixing one or more kinds of inorganic powder included in ceramic sheet 13 with polyvinyl butyral resin and dibutyl phthalate so that this slurry has a higher organic material content than ceramic sheet 13. This slurry is applied to a film of polyethylene terephthalate (which is not shown and hereinafter referred to as PET film) by the doctor blade method to form sheet-like first adhesive layer 14. First adhesive layer 14 has an inorganic powder content of 50 weight %(wt %) or less, preferably 25 wt % or less (0 wt % is excluded). The thickness of this adhesive layer 14 is 1.0 μm, but the thinner, the more preferable. Thereafter, first adhesive layer 14 is transferred to ceramic sheet 13, and the PET film is removed therefrom.

Figure 2:
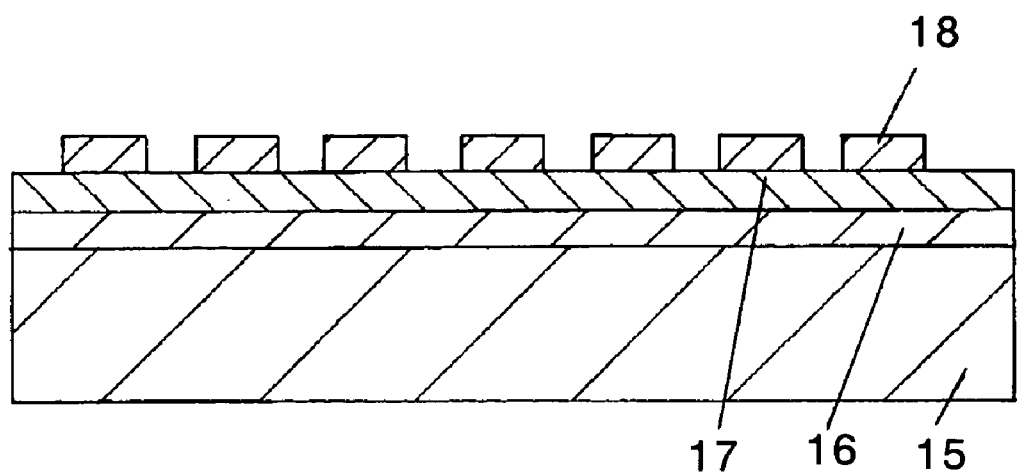

On the other hand, second adhesive layer 17 is formed to cover separation layer 16 with a thickness of about 0.1 to 1.0 μm which is formed on substantially the whole surface of second base film 15, as shown in FIG. 2. Separation layer 16 is formed in the same manner as separation layer 12, and second adhesive layer 17 is formed in the same manner as first adhesive layer 14. Next, a metal film, which has a uniform thickness of 1.0 μm and is made of nickel (Ni), is formed on second adhesive layer 17 by a thin-film forming method such as chemical vapor deposition(CVD), vacuum evaporation or sputtering. This metal film formed is made into accurately shaped internal electrode 18 by being machined by an excimer laser.

The PET film is used for first and second base films 11, 15. Since the use of the excimer laser for formation of internal electrode 18 eliminates the need to heat the metal film to 200° C. or more, second base film 15 serving as a support member remains unaffected. The use of the excimer laser can also remove only an unnecessary part of the metal film in a short time.

Figure 3:
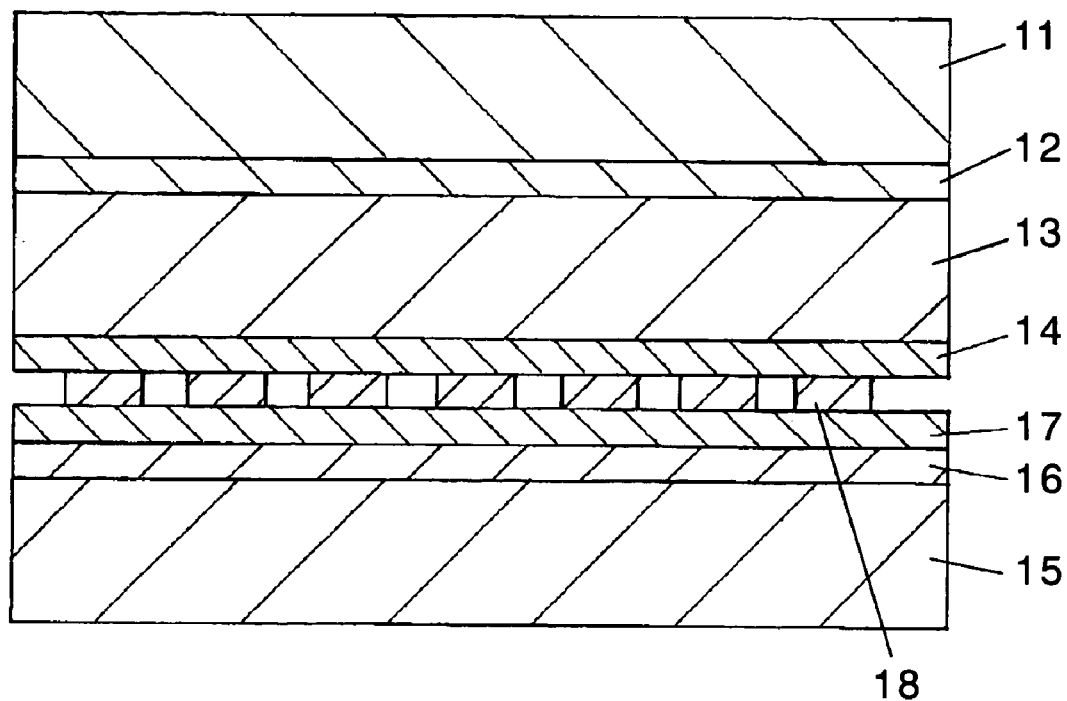

Next, ceramic sheet 13 with first base film 11 and internal electrode 18 with second base film 15 are put together as shown in FIG. 3 and pressed at 10 MPa by a press (not shown) while being heated at 130° C.

Here, the polyvinyl butyral resin included in ceramic sheet 13 and first and second adhesive layers 14, 17 softens, whereby a contact area between ceramic sheet 13 and internal electrode 18 increases. Adhesion between ceramic sheet 13 and internal electrode 18 is thus induced, while internal electrode 18 and second adhesive layer 17 are shifted onto first adhesive layer 14. It is essential that the heating is carried out at such a temperature that the polyvinyl butyral resin included in ceramic sheet 13 and first and second adhesive layers 14, 17 softens sufficiently without being decomposed. A range of 100° C. to 150° C. is thus preferable, and the higher the temperature is in this range, the more the adhesive strength improves. To ensure the shift of internal electrode 18 and second adhesive layer 17, pressing is preferably carried out at 10 MPa or more.

Figure 4:
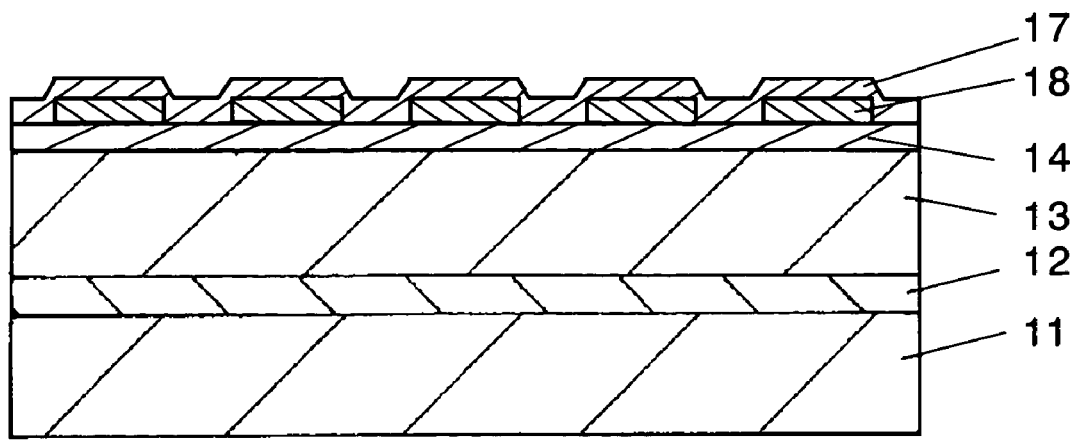
Figure 5:
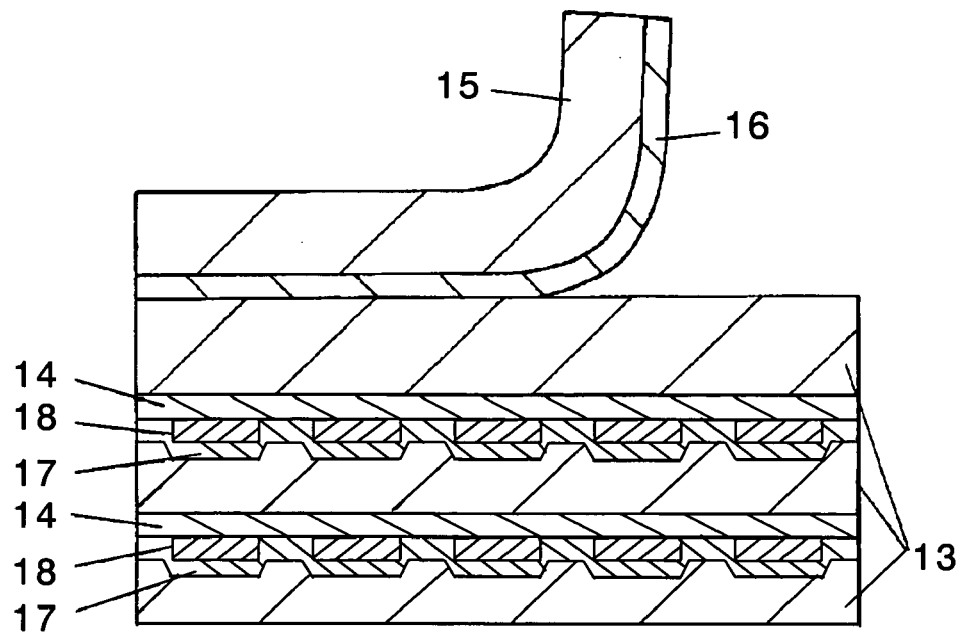

Next, second base film 15 is removed, and consequently, the ceramic sheet with the internal electrode, such as shown in FIG. 4, is obtained. Thereafter, the ceramic sheets each including the internal electrode are so stacked on top of each other in one hundred layers that ceramic sheets 13 and internal electrodes 18 are alternately stacked as shown in FIG. 5 while first base films 11 are removed, whereby a laminated block is obtained. FIG. 5 illustrates the ceramic sheets with the respective internal electrodes that are stacked in two layers.

Subsequently, the laminated block is cut into laminated bodies. The laminated body is degreased in an atmosphere of nitrogen at 350° C. in order to prevent internal electrode 18 from oxidizing excessively and then heated to 1,300° C. to allow ceramic sheets 13 to sinter enough to form ceramic layer 21. This sintering is carried out at a lower oxygen partial pressure than an equilibrium oxygen partial pressure of Ni to prevent loss of a function of internal electrode 18.

Figure 6:
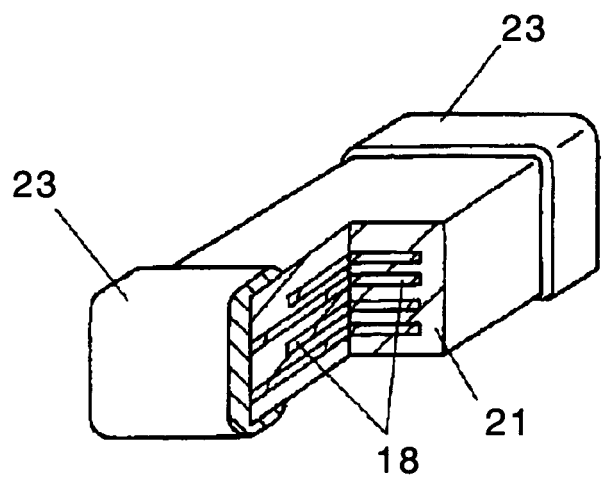
FIG. 6 is a partially cutaway perspective view of the multilayer ceramic capacitor in accordance with the first through fourth embodiments of this invention.
Figure 7:
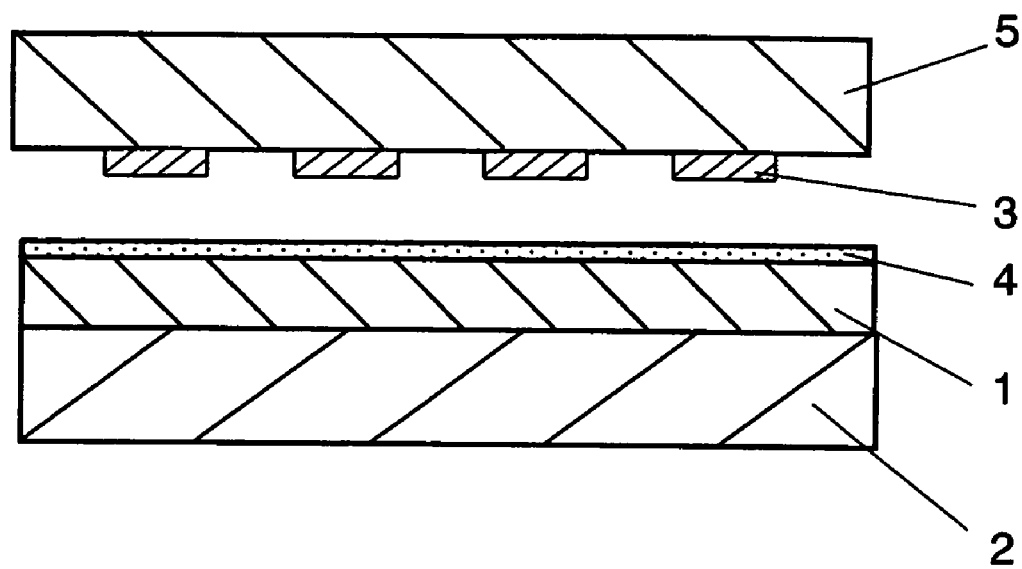
FIG. 7 is a sectional view for illustrating a conventional manufacturing process for a multilayer ceramic capacitor.

Thereafter, the laminated body is polished and then formed with external electrodes 23 made of copper at its respective end faces where internal electrodes 18 are exposed. In this way, the multilayer ceramic capacitor such as shown in FIG. 6 is obtained.

(Second Exemplary Embodiment)

A description will be provided hereinafter of a manufacturing method for a multilayer ceramic capacitor in accordance with the second exemplary embodiment.

In the present embodiment, paste made by mixing polyvinyl butyral resin, dibutyl phthalate, $Al_2O_3$ powder and MgO powder is used to make first and second adhesive layers 14, 17. The other process steps are similar to those in the first exemplary embodiment.

The total amount of $Al_2O_3$ powder and MgO powder in each of first and second adhesive layers 14, 17 accounts for 0.5 to 6.0 wt %, preferably 0.5 to 2.0 wt % of the metal included in internal electrode 18.

When the laminated body is sintered, Al and Mg, which have lower equilibrium oxygen partial pressure than Ni, remain as oxides at an interface between ceramic sheet 13 and internal electrode 18, thus improving adhesion between ceramic sheet 13 and internal electrode 18.

(Third Exemplary Embodiment)

A description will be provided hereinafter of a manufacturing method for a multilayer ceramic capacitor in accordance with the third exemplary embodiment.

First, ceramic sheet 13 is formed above first base film 11, and first adhesive layer 14 formed above a PET film is transferred in the same manner as in the first exemplary embodiment. First adhesive layer 14 is formed of a mixture of polyvinyl butyral resin, dibutyl phthalate and one or more kinds of inorganic powder included in ceramic sheet 13, and this mixture is made to have a higher organic material content than ceramic sheet 13. First adhesive layer 14 has an inorganic powder content of 50 wt % or less, preferably 25 wt % or less (0 wt % is excluded). On the other hand, electrode paste is made by mixing Ni powder with polyvinyl butyral resin as a binder, dibutyl phthalate as a plasticizer and butyl acetate as a solvent. Next, internal electrode 18 is formed above a second base film across second adhesive layer 17. Internal electrode 18 is formed by subjecting the electrode paste in a manner of screen-printing.

Subsequently, the multilayer ceramic capacitor is made in the same manner as in the first embodiment.

With this structure, the polyvinyl butyral resin is also included in internal electrode 18, so that adhesion between ceramic layer 21 and internal electrode 18 becomes more satisfactory.

(Fourth Exemplary Embodiment)

A description will be provided hereinafter of a manufacturing method for a multilayer ceramic capacitor in accordance with the fourth exemplary embodiment.

In the present embodiment, paste made by mixing polyvinyl butyral resin, dibutyl phthalate, $Al_2O_3$ powder and MgO powder is used to make first and second adhesive layers 14, 17. The other process steps are similar to those in the third exemplary embodiment.

The first through fourth embodiments described above can improve the adhesion between ceramic layer 21 and internal electrode 18 and suppress a structural defect such as delamination or a crack.

In the above-described first through fourth embodiments, first and second adhesive layers 14, 17 are formed to have substantially the same size as ceramic sheet 13, thereby to cover front and back sides of internal electrode 18 entirely. This ensures improved adhesion between ceramic sheet 13 and internal electrode 18.

For internal electrode 18, nickel alloy or other metal such as copper may be used instead of nickel. In cases where internal electrode 18 is formed by subjecting the metal film to laser beam machining, use of silver, gold or copper in particular facilitates the machining.

With first and second adhesive layers 14, 17 each having a thickness of more than 0 $\mu$m and at most 1.0 $\mu$m, a cavity is restrained from forming as a result of the organic material included in these adhesive layers 14, 17 being burned out. The thickness of each of these layers 14, 17 is thus preferably reduced as much as possible, but reducing the thickness results in reduced strength, thereby causing hard handling. Accordingly, the use of polyvinyl butyral resin having a weight average molecular weight of 1,000 or more allows formation of thin adhesive layers 14, 17 of high strength.

In formation of the laminated block, the heating carried out at not less than a softening temperature of the thermoplastic resin included at least in ceramic sheet 13 and adhesive layers 14, 17 improves fluidity of the resin, thereby improving the adhesion between ceramic sheet 13 and internal electrode 18 further. In each of the foregoing embodiments, at least ceramic sheet 13, and adhesive layers 14, 17 include the same polyvinyl butyral resin. In the third and fourth embodiments, internal electrode 18 is also includes the same polyvinyl butyral resin.

The method of stacking ceramic sheet 13, first adhesive layer 14, internal electrode 18 and second adhesive layer 17 is not limited to those described in the foregoing embodiments. Even when the ceramic sheets each including the internal electrode are stacked on top of each other or even when internal electrodes 18 and ceramic sheets 13 are alternately stacked above a support base, ceramic sheet 13 may be above or below internal electrode 18, provided that ceramic sheets 13 and internal electrodes 18 are stacked with each of first and second adhesive layers 14, 17 between ceramic sheet 13 and internal electrode 18. The presence of the adhesive layer only on one of the sides of internal electrode 18 brings about a difference of shrinkage behavior between the top side and the bottom side of internal electrode 18 in sintering, whereby the structural defect is easily induced. It is thus necessary that internal electrode 18 be provided with the adhesive layer on each of its sides. Moreover, it is preferable that first and second adhesive layers 14, 17 use the same composition for coincidence in shrinkage behavior.

In the first and third embodiments, at least one kind of inorganic powder included in ceramic sheet 13, the binder, the plasticizer and the solvent are used to make adhesive layers 14, 17. This is because condition control can be facilitated in the manufacturing process. The use of the inorganic powder included in ceramic sheet 13 can restrain a characteristic of ceramic layer 21 from changing even when the inorganic powder diffuses into ceramic layer 21 during sintering. With the inorganic powder content of 50 wt % or less, preferably 25 wt % or less, the adhesion is secured.

In the second and fourth embodiments, adhesive layers 14, 17 include $Al_2O_3$ and MgO. The similar advantage can be obtained even when at least one of Cr, Mg, Al, Si, a Cr compound, an Mg compound, an Al compound and an Si compound is used. These inorganic materials such as metal or compounds generally have lower equilibrium oxygen partial pressure than the metal included in internal electrode 18 of the multilayer ceramic electronic component, so that these inorganic materials become oxides by the end of sintering of internal electrode 18, preferably by the time internal electrode 18 starts to sinter, thereby contributing to the adhesion between ceramic sheet 13 and internal electrode 18 at the interface between ceramic sheet 13 and internal electrode 18. The similar advantage can be obtained even when the oxide is added from the beginning because the oxide will not be deoxidized. However, since the metal itself requires enough care in handling, the compound in the form of oxide, carbonate, acetate or nitrate is preferably used in consideration of productivity.

These inorganic materials become oxides in sintering and partially diffuse into ceramic layer 21. To restrain the characteristic change of ceramic layer 21 as well as to improve the adhesion between ceramic layer 21 and internal electrode 18, the total amount of the inorganic material(s) in each of adhesive layers 14, 17 falls within a proper range. Specifically, the total amount of the inorganic materials(s) in the form of oxide(s) accounts for 0.5 to 6.0 wt %, preferably 0.5 to 2.0 wt % of the metal included in internal electrode 18. This amount of the inorganic material(s) is mixed with the organic material for formation of desired adhesive layers 14, 17. The addition of Si in the form of glass including Si improves wettability with respect to ceramic sheet 13 and internal electrode 18, thereby allowing further reduction of the thickness of each of adhesive layers 14, 17 and further suppression of the structural defect.

These compounds become oxides in sintering and partially diffuse into ceramic layer 21. To restrain the characteristic change of ceramic layer 21 as well as to improve the adhesion between ceramic layer 21 and internal electrode 18, the total amount of metal compound(s) in each of adhesive layers 14, 17 falls within a proper range. Specifically, the total amount of metal compound(s) in the form of oxide(s) accounts for 0.5 to 6.0 wt %, preferably 0.5 to 2.0 wt % of the metal included in internal electrode 18. This amount of metal compound(s) is mixed with the organic material for formation of desired adhesive layers 14, 17. The addition of Si in the form of glass including Si improves wettability with respect to ceramic sheet 13 and internal electrode 18, thereby allowing further reduction of the thickness of each of adhesive layers 14, 17 and further suppression of the structural defect.

The Cr compound, the Mg compound, the Al compound or the Si compound is preferred to the inorganic powder included in ceramic sheet 13 to be included in adhesive layers 14, 17. This is because the adhesion between ceramic sheet 13 and internal electrode 18 improves easily. Since the inorganic powder sinters after the sintering of Ni used for internal electrode 18 ends, while the Cr, Mg, Al and Si compounds already become oxides by the end of the sintering of Ni, preferably by the time Ni starts to sinter, the Cr, Mg, Al or Si compound easily performs its function as an adhesive at the interface between ceramic layer 21 and internal electrode 18 during sintering of Ni.

The metal element included in adhesive layers 14, 17 needs to (1) have a lower equilibrium oxygen partial pressure than the metal included in internal electrode 18 and (2) oxidize by the end of the sintering of internal electrode 18, preferably by the time internal electrode 18 starts to sinter so as to lie at the interface between ceramic sheet 13 and internal electrode 18.

The similar advantage can be obtained even when a mixture of the inorganic powder included in ceramic sheet 13 and at least one of the Cr, Mg, Al and Si compounds is included in adhesive layers 14, 17. Here, the amount of mixture included not only meets the condition mentioned earlier but also accounts for 50 wt % or less of the adhesive layers.

Each of the foregoing embodiments has referred to the multilayer ceramic capacitor as an example. However, the similar advantage can be obtained by a method of manufacturing a multilayer ceramic electronic component, such as a varistor, an inductor, a ceramic board, a thermistor or a piezoelectric ceramic component, which is formed by alternately stacking ceramic layers and internal electrodes.

INDUSTRIAL APPLICABILITY

A provided manufacturing method for a multilayer ceramic electronic component according to the present invention suppresses a structural defect resulting from loss of an adhesive layer and provides excellent adhesion between a ceramic layer and an internal electrode.

Reference Numerals in the Drawings
1 ceramic sheet
2 base film
3 metal film
4 adhesive layer
5 substrate
11 first base film
12 separation layer
13 ceramic sheet
14 first adhesive layer
15 second base film
16 separation layer
17 second adhesive layer
18 internal electrode
21 ceramic layer
23 external electrode

The invention claimed is:
1. A method of manufacturing a multilayer ceramic electronic component, the method comprising the steps of:
 (A) providing a ceramic sheet;
 (B) providing an internal electrode;
 (C) providing an adhesive layer separately from the ceramic street;

(D) alternately stacking the ceramic sheet and the internal electrode with the adhesive layer between the ceramic sheet and the internal electrode to obtain a laminated body; and (E) sintering the laminated body, wherein the adhesive layer includes a thermoplastic resin and at least one of inorganic powders including:

(1) Cr, Mg, Al, and Si; and (2) a Cr compound, an Mg compound, an Al compound, and an Si compound.

2. The manufacturing method of claim 1, wherein the adhesive layer has a size equal to a size of the ceramic sheet.

3. The manufacturing method of claim 1, wherein the adhesive layer has a total inorganic powder content of at most 50 weight %.

4. The manufacturing method of claim 1, wherein the ceramic sheet includes a thermoplastic resin similar to the thermoplastic resin of the adhesive layer.

5. The manufacturing method of claim 1, wherein step (A) includes heating at not less than a softening temperature of the thermoplastic resin.

6. The manufacturing method of claim 1, wherein the internal electrode is formed of a metal film.

7. The manufacturing method of claim 6, wherein the internal electrode is formed of the metal film machined with a laser beam.

8. The manufacturing method of claim 1, wherein the adhesive layer has a thickness of at most 1.0 $\mu$m.

9. The manufacturing method of claim 1, wherein the thermoplastic resin is a butyral resin.

* * * * *

UNITED STATES PATENT AND TRADEMARK OFFICE
CERTIFICATE OF CORRECTION

| | | |
|---|---|---|
| PATENT NO. | : 7,014,725 B2 | Page 1 of 1 |
| APPLICATION NO. | : 10/470099 | |
| DATED | : March 21, 2006 | |
| INVENTOR(S) | : Atsuo Nagai et al. | |

It is certified that error appears in the above-identified patent and that said Letters Patent is hereby corrected as shown below:

column 6, line 67: replace "ceramic street" with --ceramic sheet--.

Signed and Sealed this

Twenty-second Day of August, 2006

JON W. DUDAS
*Director of the United States Patent and Trademark Office*